United States Patent [19]

Brack

[11] 4,296,522
[45] Oct. 27, 1981

[54] REVERSIBLE DUAL WINDSHIELD WIPER

[76] Inventor: Frederick Brack, 67 Pine St., Massapequa, N.Y. 11758

[21] Appl. No.: 50,474

[22] Filed: Jun. 20, 1979

[51] Int. Cl.³ .............................................. B60S 1/38
[52] U.S. Cl. ................................... 15/250.36; 15/245
[58] Field of Search .......... 15/250.36, 250.37, 250.38, 15/250.39, 250.40, 250.41, 250.42, 245

[56] References Cited

U.S. PATENT DOCUMENTS

| | | | |
|---|---|---|---|
| 2,230,489 | 2/1941 | Grossfeld et al. | 15/245 |
| 2,322,312 | 6/1943 | Osborn | 15/250.36 X |
| 2,852,798 | 9/1958 | Grossfeld | 15/245 |
| 3,930,279 | 1/1976 | Arman | 15/250.36 |
| 3,961,395 | 6/1976 | Journée | 15/250.36 |

*Primary Examiner*—Edward L. Roberts
*Attorney, Agent, or Firm*—Darby & Darby

[57] ABSTRACT

A reversible dual windshield wiper having a blade holder with a flexible wiping blade mounted on each side thereof. One or more retaining clips are mounted to a wiper arm to accept and hold the blade holder with either wiping blade in the active position. Stops are also provided to prevent the wiper from moving longitudinally with respect to the arm.

4 Claims, 4 Drawing Figures

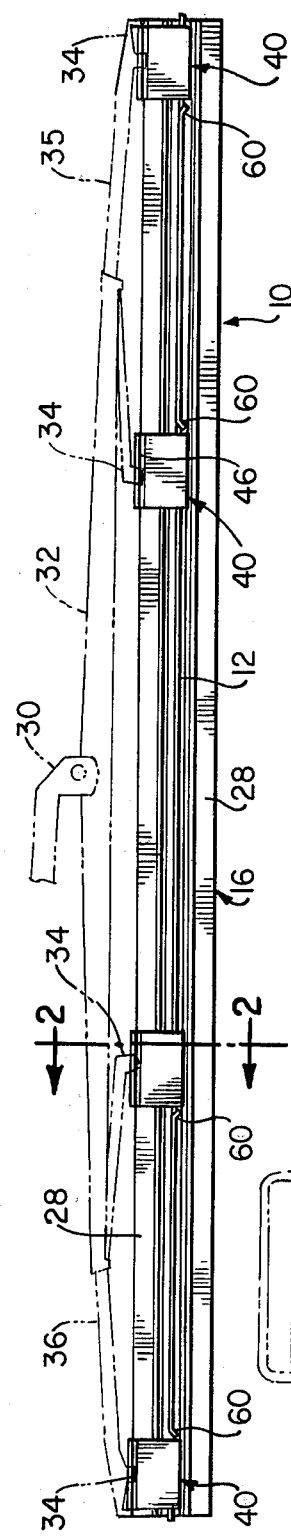
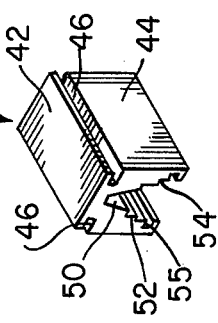
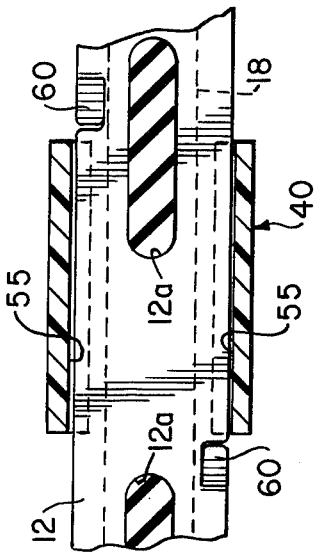
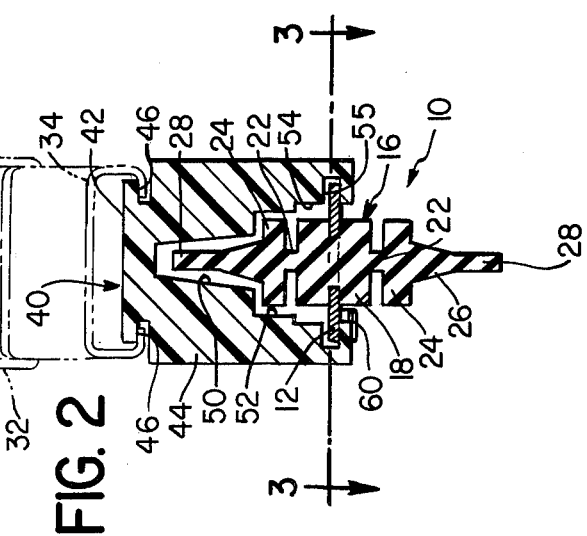

REVERSIBLE DUAL WINDSHIELD WIPER

Various forms of wipers for windshields of automobiles and other types of vehicles are known. A typical wiper comprises a metal or plastic blade holder which is adapted to be connected to the arm of the wiper, which arm is in turn connected to the vehicle's wiper motor. A blade, generally of a flexible rubber, is mounted on the arm. When the blade wears out, or dries out, generally the complete wiper must be replaced even though the blade holder is not damaged and can be reused. While a wiper has been proposed in which the rubber wiper blade can be replaced, thereby re-using the metal holder portion, this approach generally has not found favor with the consumer since replacement of the wiper blade was somewhat inconvenient.

The present invention relates to a novel wiper in which two blades are provided, one on each side of a central holding member. One or more retaining clips are provided which are attached to the wiper arm for holding the wiper. The clips are configured such that the wiper can be held therein with either of the two blades being in an operative position with respect to the windshield. Thus, when one of the wiper blades wears out, it is necessary only to remove the wiper from the retaining clip, or clips, and to reverse it so that a new blade surface is provided for the windshield.

It is, therefore, an object of the present invention to provide a novel windshield wiper having two separate wiper blades thereon, one of which is usable at a time.

A further object is to provide a windshield wiper having two wiper blades thereon, one on each side of a central holder member with the wiper being reversible so that one blade can be used at a time.

An additional object is to provide a novel windshield wiper having a blade on each side of a central holding member and a retaining clip which can hold the wiper with either blade exposed.

A further object is to provide a reversible, dual windshield wiper having two blades thereon, with the wiper and blades being reversible in a holding clip.

Other objects and advantages of the present invention will become more apparent upon reference to the following specification and annexed drawings in which:

FIG. 1 is a longitudinal plan view showing the attachment of the novel wiper to a wiper arm which is shown in phantom lines;

FIG. 2 is a cross-section of the wiper and one of the holding clips taken along lines 2—2 of FIG. 1;

FIG. 3 is a cross-sectional view taken along lines 3—3 of FIG. 2; and

FIG. 4 is a perspective view of a retaining clip.

Referring to the drawings, the wiper includes a central blade holding member 12 of metal or plastic material. Holding member 12 can either be a single piece, or else it can be two strips.

Attached to holding member 12 is a dual-reversible wiper blade 16. The blade 16 can be of a suitable material, for example, rubber, which is molded or extruded into the desired shape. Extrusion or molding is possible with the blade of the subject application since it is fully symetrical along its length.

Blade 16 is formed with a central body portion 18 which has slits 19 on each side thereof to accept the holding member 12 with a tight fit. The active blade portion is formed on each side of the central piece 18. This includes a short stub 22 which spaces the blade tip 28 from the central piece 18 so that the blade will have the ability to bend. From the stub 22 the blade widens out into a base piece 24 from the central portion of which tapers down an angled piece 26 into a substantially rectangular and relatively thin tip 28. The tip 28 provides most of the active wiping surface against the windshield (not shown). It should be understood that the blade on each side of holder 12 is symmetrical.

The attachment of the blade to the holding member 12 is shown in FIG. 3. In a preferred embodiment, the holder 12 is clamped in a mold which has upper and lower cavities with which the blade material, e.g. rubber, is injected. The blade material, upon being molded, fills the interstices 12a of the blade holder 12 and a firm structure is provided.

As seen in FIG. 1, wiper 10 is to be attached to a wiper arm 30 which is connected to the wiper motor (not shown). To do this, a central strut 32 is provided which has a plurality of depending holding fingers 34. As shown, a pair of fingers 34 are formed as the opposite ends of a single piece of material 35, of metal or plastic. Each finger 34 has a downwardly extending spring bracket 36 at its lower end. The arm is of generally conventional construction with the exception of the spring brackets 36. The purpose of the brackets 36 is to hold retaining clips 40 which in turn are used to hold the wiper.

The retaining clip 40 can best be described by referring to FIGS. 2 and 4. A clip 40 is preferably made of a suitable inert material, such as hard rubber, or a plastic material such as nylon. Each clip includes a top surface 42 of narrower width than a central body portion 44, there being slots 46 separating the top surface 42 and the body 44 so that the ends of a spring bracket 36 can fit therein to hold a retaining clip 40. It should be understood, of course, that the retaining clips 40 can be attached to the ends of the fingers 34 by any other suitable arrangement, for example, by rivets, bent metal clamps or any other suitable fastener.

The interior of the body 44 of retaining clip 40 is shaped in a stepped fashion to conform generally to the shape of one of the dual blades. The body splits into two legs as defined by a generally triangular shaped upper opening 50 which accepts the tip 28 and triangular portion 26 of a blade 10. The opening of the body then widens out to a bottom portion 52 to accept the base 24 and the stub 22 of the blade. The opening further widens out to the bottoms 54 of each leg, each of which also has a groove 55 to hold one side of the holding member 12.

Due to the resiliency of the material, the two legs of the retaining clip body can move apart so that the sides of the holding member 12 can be placed in the respective slot 55. Thus, by moving the legs of a clip apart, the wiper can be snapped into and out of the clips reversing the direction of the blade or exposing one blade or the other.

In use, the wiper arm 32 is connected to the pivoting member 30. The ends 34 of the fingers have the retaining clips 40 attached thereto as previously described. To attach the wiper to the clips 40, it is only necessary to force the metal holding member 12 through the bottom of the openings of the retaining clips. The retaining clip legs have an amount of resiliency since they are made of a plastic material. As the legs move apart each side of the holder member 12 is snapped into the respective slot 55. The snapping in action can take place one clip at a time since the wiper has an amount of resiliency along its length.

As seen in FIG. 1, the metal holding member 12 has several downstruck tabs 60, each of which is to be located adjacent one edge of a respective clip. The purpose of the tabs 60 is to prevent the wiper from moving longitudinally relative to the retaining clips 40. As seen in FIGS. 1 and 2, the tabs 60 engage the bottom 54 of a clip.

When the active wiper blade is to be changed, for example, because it is worn out, becomes pitted or becomes dry, it is only necessary to grasp the metal holding piece and to pull down and/or to spread the legs of the various retaining clips 40. The wiper is then taken out of the clips and it is reversed. It is then reinserted in the manner previously described, presenting a new active blade surface. In this case, the tabs 60 will be pointing upwardly but they will still engage the bottoms 54 of the clips.

As can be seen, applicant's invention provides a relatively simple way to effectively double the life of a conventional wiper with little additional expense. That is, the added cost for forming an extra blade surface, while extruding one blade, is relatively small.

What is claimed is:

1. A revisible dual blade windshield wiper assembly comprising:

a blade holder formed of an elongated piece of material having upper and lower faces and substantially flat edge portions, a flexible blade of elastomeric material extending from each of the faces of said blade holder, each of said blades having a base which is mounted to said blade holder and from which said blades extend; said blade holder spanning the entire base of each said blade and leaving a said edge portion thereof exposed on each side of each blade, each blade being of the same general shape, an arm, and a plurality of retaining clips mounted to said arm, each said retaining clip having a pair of legs which can be spread apart, a slot on the inner face of each of the legs of a said retaining clip in which the edge portions of the blade holder are placed.

2. A wiper as in claim 1 wherein the legs of the retaining clip define an opening which generally conforms to the shape of each of said blades.

3. A wiper as in claim 1 wherein each of said blades are formed to include a central piece from which extends on opposite sides thereof a reduced width stub piece, then widening to a base piece which then tapers to a blade tip.

4. An assembly as in claim 1 wherein at least one tab is provided on an edge portion of said blade holder to engage a said retaining clip to limit longitudinal movement of the blade holder relative to said clips and said arm.

* * * * *